United States Patent
Xiao et al.

(10) Patent No.: US 7,283,692 B2
(45) Date of Patent: Oct. 16, 2007

(54) SIMULTANEOUS INTERROGATION OF MULTI WAVELENGTH-MODULATED FIBER OPTICAL SENSORS BY MODULATING AN ARRAYED WAVEGUIDE GRATING BASED DEMULTIPLEXER

(75) Inventors: Gaozhi Xiao, Kanata (CA); Ping Zhao, Kanata (CA); Fengguo Sun, Ottawa (CA); Zhenguo Lu, Ottawa (CA); Zhiyi Zhang, Ottawa (CA); Chander P. Grover, Gloucester (CA)

(73) Assignee: National Research Council of Canada, Ottawa, ON (CA)

( * ) Notice: Subject to any disclaimer, the term of this patent is extended or adjusted under 35 U.S.C. 154(b) by 0 days.

(21) Appl. No.: 11/214,783

(22) Filed: Aug. 31, 2005

(65) Prior Publication Data

US 2006/0045412 A1    Mar. 2, 2006

Related U.S. Application Data

(60) Provisional application No. 60/606,430, filed on Sep. 2, 2004.

(51) Int. Cl.
*G01B 9/00* (2006.01)
*G02B 6/12* (2006.01)

(52) U.S. Cl. ......................................... 385/12; 356/478
(58) Field of Classification Search .................. 385/12; 356/478
See application file for complete search history.

(56) References Cited

U.S. PATENT DOCUMENTS 6,643,419 B2 *  11/2003  Chang et al. .................. 385/14
2004/0033004 A1 *   2/2004  Welch et al. .................. 385/14

OTHER PUBLICATIONS

Fast Optical Wavelength Interrogator Employing Arrayed Waveguide Grating For Distributed Fiber Bragg Grating Sensors- Journal of Lightwave Technology vol. 21, No. 1 Jan. 2003—Yasukazu Sano and Toshihiko Yoshino.

Extended range interrogation of wavelength division multiplexed fibre Bragg grating sensors using arrayed waveguide grating—Electronics Letters Nov. 27, 2003, vol. 39 No. 24, D.C.C. Norman, D.J. WEbb and R.D. Pechstedt.

* cited by examiner

*Primary Examiner*—Michelle Connelly-Cushwa
*Assistant Examiner*—Jerry T. Rahll
(74) *Attorney, Agent, or Firm*—Marks & Clerk; Richard J. Mitchell

(57) ABSTRACT

A compact interrogator for the simultaneous interrogation of multi wavelength-modulated fiber optical sensors, includes a planar waveguide based demultiplexer receiving input signals from the sensors. An array of detectors is coupled to output waveguides of the demultiplexer corresponding to different nominal wavelengths. A tuning element matches the nominal wavelengths of the output waveguide to the input signals from the respective sensors to find the wavelengths of the individual sensors to be interrogated.

20 Claims, 6 Drawing Sheets

SIMULTANEOUS INTERROGATION OF MULTI WAVELENGTH-MODULATED FIBER OPTICAL SENSORS BY MODULATING AN ARRAYED WAVEGUIDE GRATING BASED DEMULTIPLEXER

FIELD OF THE INVENTION

This invention relates to the field of photonics, and in particular to an interrogation technique for applications in wavelength measurement, in particular monitoring distributed wavelength-modulated fiber optical sensors or multi wavelength-modulated fiber optical sensor arrays.

BACKGROUND OF THE INVENTION

Wavelength modulated fiber optic sensors, in particular fiber Bragg grating (FBG) sensors, have been applied to many sensing applications. See, for example, A. Othonos, "Bragg Gratings in Optical Fibers: Fundamentals and Applications", in Optical Fiber Sensor Technology, K. T. V. Grattan and B. T. Meggitt, eds. pp.79-188, Kluwer Academic Publishers, Boston, 2000. The most important advantage of this type of sensor is that wavelength is an absolute parameter and not affected by the losses in the system or fluctuations in the source power.

For field applications, the wavelength interrogator (which is a key component of the sensor system) is required to have the characteristics of portability, ruggedness, low cost, high measurement accuracy, high speed and multiplexing capability. However, none of the traditional methods is enough satisfactory for those requirements. In recent years, arrayed waveguide gratings (AWO) based interrogation systems have shown great potential for fulfilling all those requirements. One technique described by Y. Sano and T. Yoshino, entitled "Fast optical wavelength interrogator employing arrayed waveguide grating for distributed fiber Bragg grating sensors", J. Lightwave Techno. Vol. 21, pp. 132-139, 2003, involves taking the ratio of the intensities in adjacent AWG channels when the fiber Bragg grating (FBG) wavelength lies between the two channels. This simple approach yielded good performance but suffers from a limited usable range (less than the channel spacing) and a reduced sensitivity near the extremes of the range.

D. C. C. Norman, D. J. Webb and R. D. Pechstedt, "Extended range interrogation of wavelength division multiplexed fibre Bragg grating sensors using arrayed waveguide grating", Electro. Lett. Vol. 39, pp. 1714-1715, 2003 overcame those drawbacks by using a heterodyne approach based on interferometric wavelength shift detection. Nevertheless, it makes the interrogation system much more complicated.

We have proposed another interrogation approach using an AWG based demultiplexer. This approach is based on the idea that by changing the temperature of an AWG, the transmission wavelength of one of its channels can be tuned to the sensor wavelength. Thus we are able to correlate the sensor wavelength to the AWG temperature.

SUMMARY OF THE INVENTION

The present invention expands the above approach and provides several ways to make hand-held, high performance interrogators for multi wavelength-modulated fiber optical sensor applications. By electrically modulating an arrayed waveguide gratings (AWG) based demultiplexer, the wavelengths of wavelength-modulated fiber optical sensors can be precisely measured. Based on this principle, a hand-held interrogator can be designed, which consists of an arrayed waveguide grating (AWG) based demultiplexer, a heater or electrodes, a detector array and a controller.

According to the present invention there is provided a compact interrogator for the simultaneous interrogation of multi wavelength-modulated fiber optical sensors, comprising a planar waveguide based demultiplexer receiving input signals from the sensors; an array of detectors coupled to output waveguides of the demultiplexer corresponding to different nominal wavelengths; and means for tuning the demultiplexer to match the nominal wavelengths of the output waveguide to the input signals from the respective sensors.

The tuning means may be a heater for varying the temperature of the demultiplexer or an electrode for applying a voltage or current.

The waveguide materials of the demultiplexer can, for example, be silica, semi-conductor, polymers. The sensors interrogated by the inventive device can be fiber Bragg grating sensors, long period grating sensors, fabry-perot sensors etc.

DETAILED DESCRIPTION OF THE INVENTION

The operational principles of an AWG have been studied in detail and reported in the literature. See, for example, M. K. Smit and C. V. Dan, "PHASAR-based WDM devices: principles, design and applications", IEEE J. Topics Quantum Electron. Vol. 2, pp. 236-250, 1996.

Figure 1:
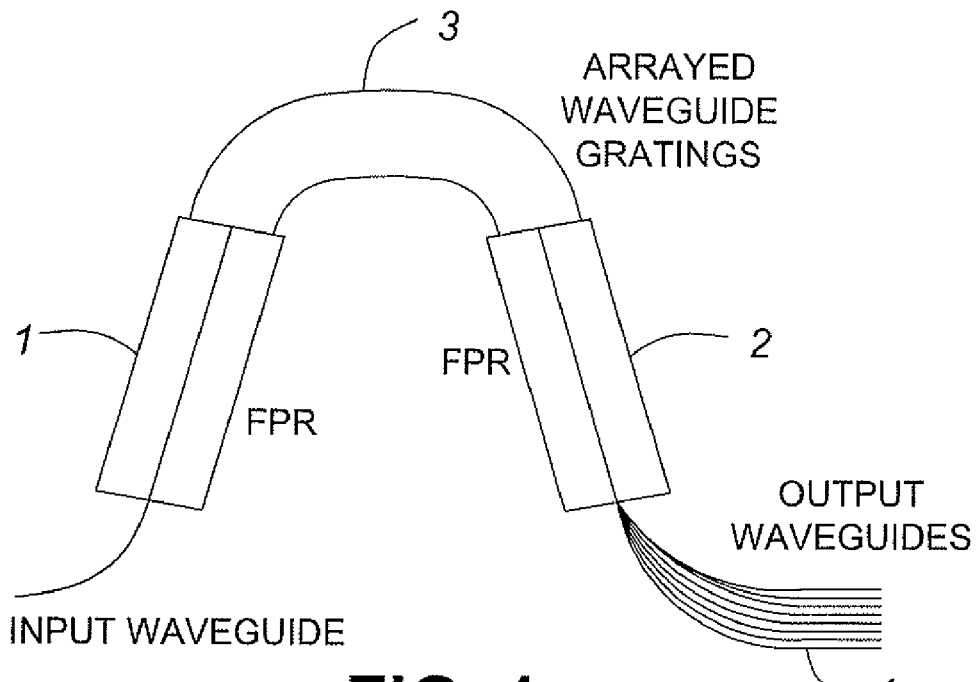
FIG. 1 is a schematic illustration of an AWG based demultiplexer.

An AWG, as shown in FIG. 1, consists of two slab waveguides 1, 2, providing free propagation regions (FPR) connected by an array of waveguides 3 with a set length difference between the neighboring waveguides. When used as a demultiplexer, light enters the first slab waveguide 1 and diverges into the waveguide array 3, then arrives at the second slab waveguide 2 with different relative phases. This results in the different wavelengths of light being focused into the different output waveguides 4. FIG. 1 illustrates a 1×n channel AWG multiplexer. For a typical AWG multiplexer, the values of n are 4, 8, 16, 32 or 40 channels, but in theory there can be any number of channels.

Figure 2:
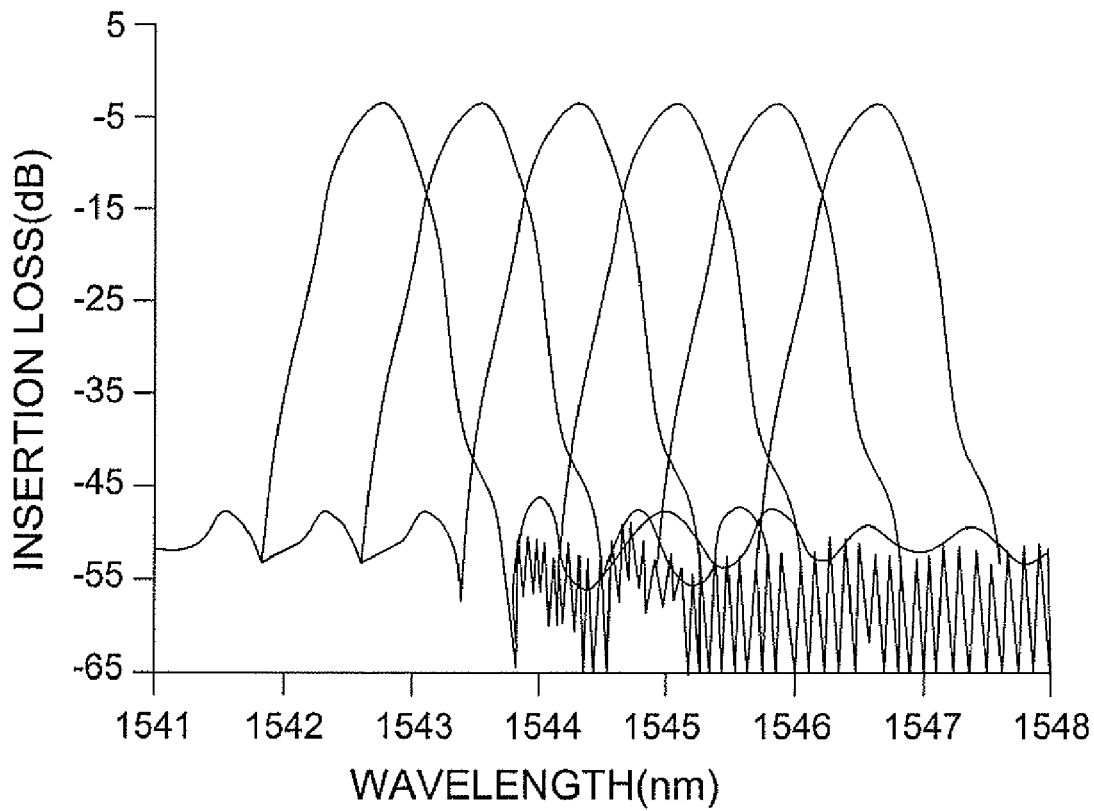
FIG. 2 is part of the transmission spectra of a typical Gaussian type AWG based demultiplexer.

FIG. 2 illustrates the typical transmission spectra of a Gaussian type AWG demultiplexer measured by an Ando AQ6317B optical spectrum analyzer (OSA). As it shows, those peaks are Gaussian (as designed) and can be described mathematically as:

$$I_{An}(\lambda) = A_n \exp\left[-4(\ln 2)\frac{(\lambda - \lambda_{An})^2}{\Delta\lambda_{An}^2}\right] + A_{n0} \quad (1)$$

where $A_n$, $\lambda_{An}$ and $\Delta\lambda_{An}$ are the peak transmittance, center wavelength and FWHM of the Gaussian profile of the $n^{th}$ channel of the AWG. $A_{n0}$ is the noise level. It is very low (as shown in FIG. 2) and can be neglected.

For the sake of the simplicity of the mathematic analyses, we assume that the spectra of the wavelength-modulated sensors are Gaussian (which are close to majority practical cases), i.e.

$$I_{Si}(\lambda) = S_i \exp\left[-4(\ln 2)\frac{(\lambda - \lambda_{Si})^2}{\Delta\lambda_{Si}^2}\right] \quad (2)$$

where $S_i$, $\lambda_{Si}$ and $\Delta\lambda_{Si}$ are the peak transmittance, center wavelength and FWHM of the Gaussian profile of the $i^{th}$ sensor in a multi-sensor network.

We further assume that the signal collected by the $n^{th}$ AWG channel is mainly from the $i^{th}$ sensor while the contributions from other sensors are very small and can be neglected. This assumption can be easily satisfied by properly design the sensor's working wavelength range. Hence, the power detected by the $n^{th}$ AWG channel can be described as:

$$I_{ni}(\lambda_{An}) \approx \quad (3)$$
$$k_n A_n S_i \Delta\lambda_{An} \Delta\lambda_{Si} \times \sqrt{\frac{\pi}{(\Delta\lambda_{An}^2 + \Delta\lambda_{Si}^2)4\ln 2}} \times \exp\left[-4(\ln 2)\frac{(\lambda_{An} - \lambda_{Si})^2}{\Delta\lambda_{An}^2 + \Delta\lambda_{Si}^2}\right]$$

where $k_n$ is a constant representing the source power, detector sensitivity etc. It will be apparent from this equation that the $I_{ni}(\lambda_{An}) \sim \lambda_{An}$ curve is a Gaussian with the FWHM equaling $\sqrt{(\Delta\lambda_{An}^2 + \Delta\lambda_{Si}^2)}$ and the peak value $K_n$ as $$K_n = k_n A_n S_i \Delta\lambda_{An} \Delta\lambda_{Si} \times \sqrt{\frac{\pi}{(\Delta\lambda_{An}^2 + \Delta\lambda_{Si}^2)4\ln 2}} \quad (4)$$

The peak value is achieved when $\lambda_{An} = \lambda_{Si}$. Therefore, if we can tune the AWG transmission wavelength by a simple and linear manner, we will be able to measure the sensor wavelength by finding the $\lambda_{An}$ value corresponding to the peak of the $I_{ni}(\lambda_{An}) \sim \lambda_{An}$ curve, i.e.

$$\lambda_{An}(X) = B*X + C \quad (5)$$

where B and C are constants respectively and X is the tuning mechanism, be it the temperature of arrayed waveguides, or the current or voltage applied on the arrayed waveguides.

Combining equation (3), (4) and (5), we have:

$$I_{ni}(X) = K_n \exp\left[-4(\ln 2)\frac{(B*X + C - \lambda_{Si})^2}{\Delta\lambda_{An}^2 + \Delta\lambda_{Si}^2}\right] \quad (6)$$

Equation (6) shows that the $I_{ni}(X) \sim X$ curve is also a Gaussian with the FWHM as $\sqrt{(\Delta\lambda_{An}^2 + \Delta\lambda_{Si}^2)}$ and the peak value as $K_n$, which is reached when $\lambda_{Si} = B*X + C$. Hence by finding the tuning parameter corresponding to the peak of the $I_i(X) \sim X$ curve, we can obtain the sensor wavelength $\lambda_{Si}$.

Figure 3:
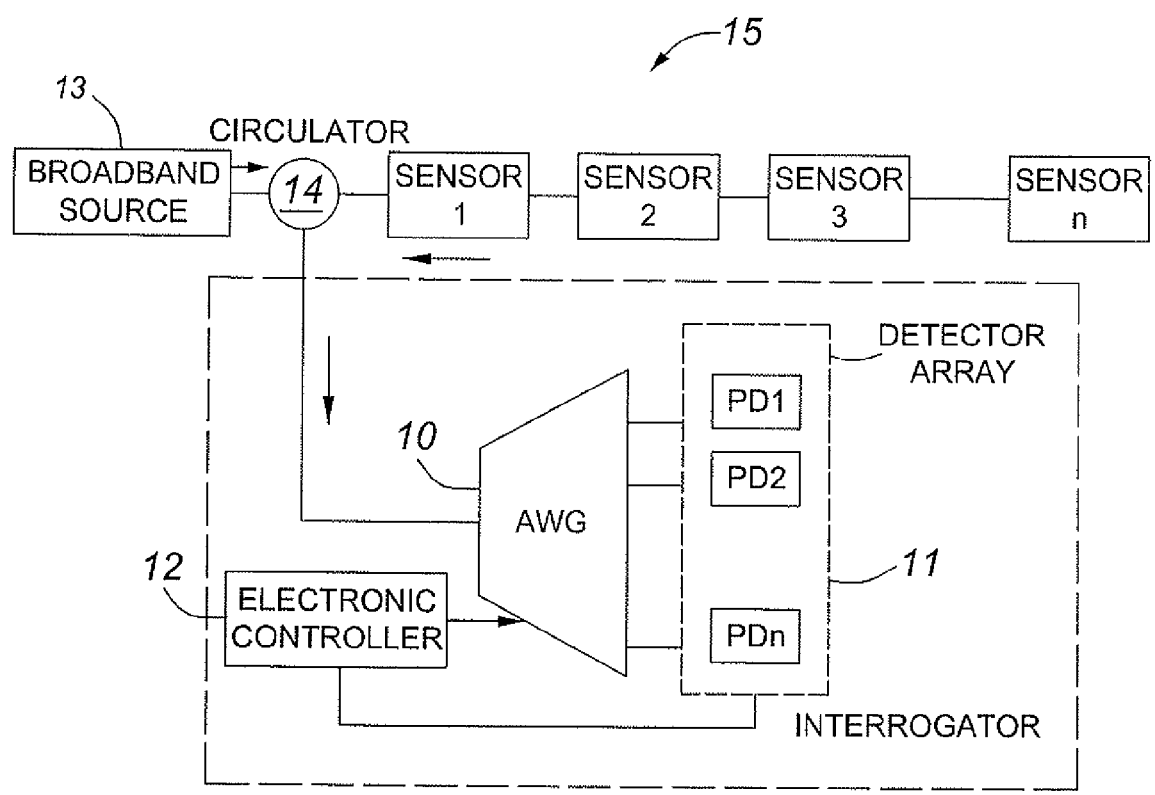
FIG. 3 is a schematic illustration of an example of the proposed interrogator system.

FIG. 3 illustrates an example of a proposed interrogator system. It consists of an AWG based interrogator chip, a photo detector array 11 and an electronic controller 12, which is used to do thermal scan (or electrical scan) of the AWG chip and collect, manage and display the data. For illustration purposes, a broadband light source 13, an optical circulator 14, and a distributed sensor array 15 is also shown in the illustration. All the optical components can be connected by optical fiber or directly coupled together by butter coupling in order to miniaturize the dimension of the interrogator.

Figure 8:
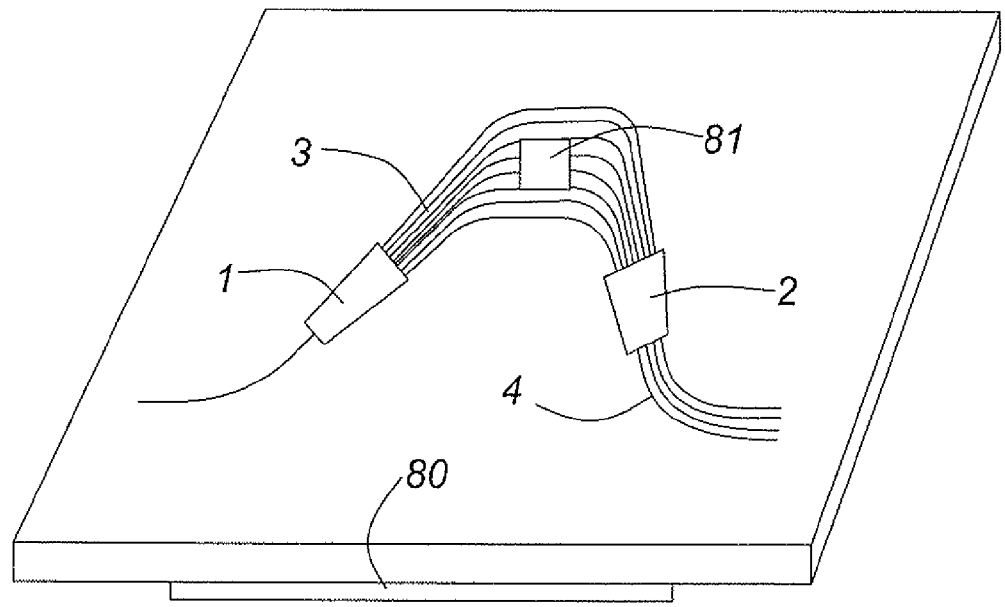
FIG. 8 illustrates a first embodiment of an AWG array with a heater and temperature sensor.

The first method of constructing an AWG based interrogator chip shown in FIG. 8 is to bond a film heater 80 (or thermal electric cooler) to the back of the AWG die, and bond a temperature sensor 81, such as a themistor or RTD (resistive temperature detector), to the arrayed waveguides 81.

The transmission wavelength of AWG based demultiplexer changes linearly with the temperature of the arrayed waveguides 3, i.e.

$$\lambda_{An}(T) = B*T + C \quad (7)$$

where B and C are constants respectively and T is the temperature of arrayed waveguides.

Figure 4:
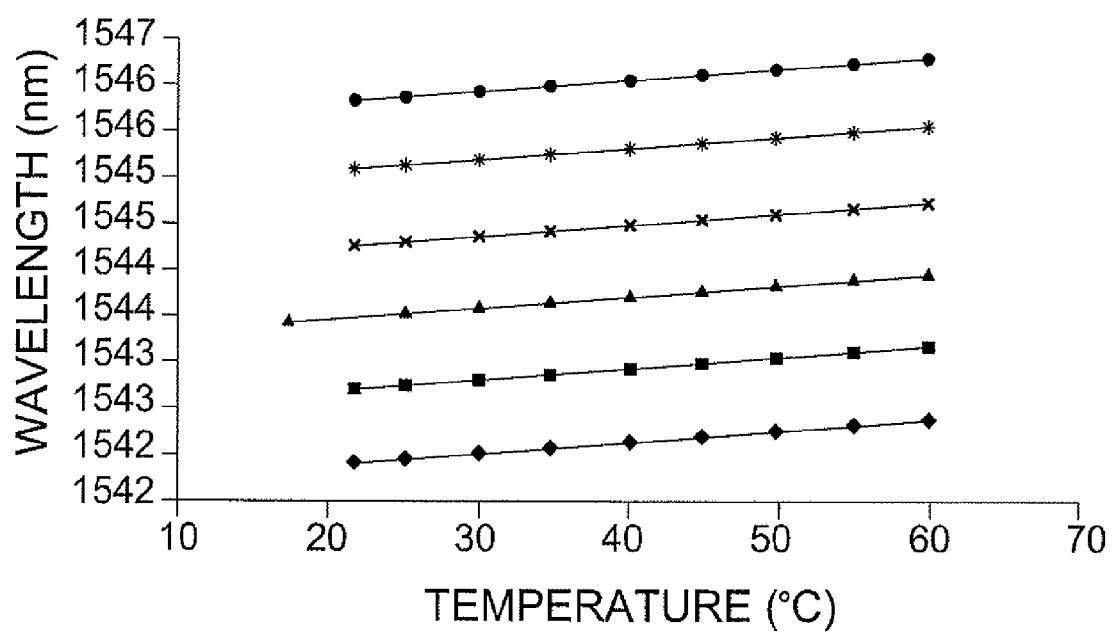
FIG. 4 is an illustration of the relationship between AWG transmission wavelengths and the temperature of the arrayed waveguides.

FIG. 4 shows the temperature effect on the wavelengths of six selected channels of an AWG based demultiplexer. The wavelengths were measured by an Agilent Optical Dispersion Analyzer 86038A, which has a resolution of better than 1 pm. The results show that $\lambda_{An}$ changes linearly with the temperature at a rate of 0.011 nm/° C. (Value of B). The value of C is depending on the AWG channel number. Therefore, based on the analysis above, we can measure the sensor wavelength by tuning the temperature of the arrayed waveguides.

Figure 9:
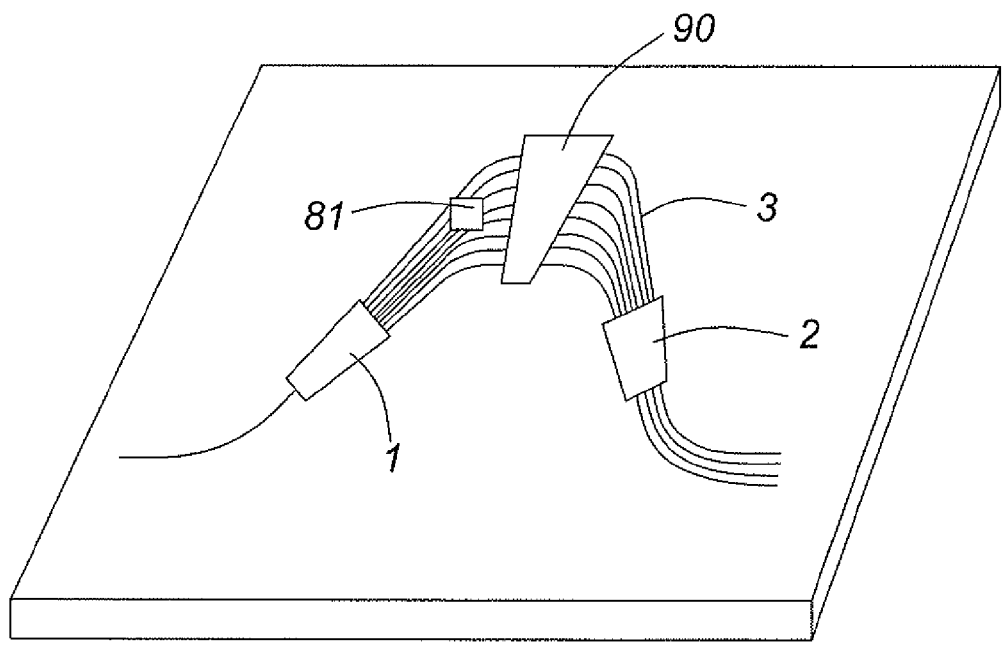
FIG. 9 illustrates a second embodiment of an AWG array with a heater and temperature sensor.

In practice, it is a waste of energy to heat the whole AWG chip as we are only interested in the temperature of the arrayed waveguide area of the AWG chip. A better way, shown in FIG. 9, to construct an AWG based interrogator chip (the second example) shown in FIG. 3 is to employ standard thin film heater deposition and patterning techniques to fabricate thin film heaters 90 on the surface of arrayed waveguides, which would significantly decrease the power consumption as the heating area is greatly reduced. In addition, the thin film heater offers an added advantage. Its response time is only around 2 ms, which is much short than that needed for heating up the whole device. The 2 ms response rate would make it feasible for the applications of the technique to most dynamic measurement. To help the heat dissipation from the AWG chip and to maintain a good measuring reproducibility, it would be recommended to use a thermal electric cooler (TEC) to maintain the bottom of AWG chip at a constant temperature. To further increase the measuring reproducibility and reduce the effect of ambient temperature, athermal packaging of AWG based demultiplexer is recommended.

As an AWG chip is very small, a typical one is about 30 mm×55 mm, and the detector array can be made smaller than 10 mm×30 mm, it is obvious that we will be able to design and package the interrogator example shown in FIG. 3 into a hand-held, all solid device.

In this second example, if the materials of the arrayed waveguides are electro-optic materials, the AWG based demultiplexer can also be used as the interrogator, but instead of heater, thin film electrodes are deposited on the arrayed waveguides. By modulating the current or voltage applied on the electrode, we can satisfy equation (5), thus making it feasible to interrogate the sensor wavelengths. The response of this type of interrogator can be very fast and to the nano-second scale.

The interrogator chip shown in FIG. 3 (the third example) can be an echelle grating based demultiplexer with film heater or TEC attached to the back of the chip as the transmission wavelength of this type of demultiplexer also has the temperature behavior shown in Equation (7).

Figure 5:
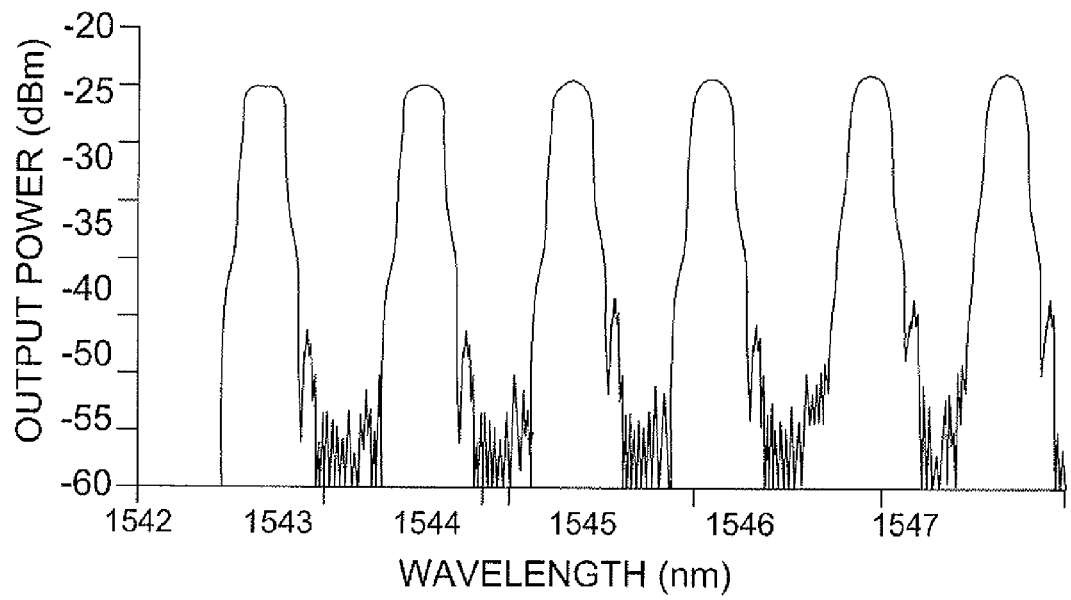
FIG. 5 is an illustration of the response spectra of typical distributed FBG sensors.

Though in the analysis we assume that the sensor spectra are Gaussian, but it is not an absolute requirement. FIG. 5 shows the reflection spectra of a distributed six fiber Bragg grating sensors. The spectra were measured by the OSA mentioned above. As it can be seen from the Figure, the spectra of the sensors are not truly Gaussian but close to Gaussian. The mathematic description of those spectra is complicated. However, since we are employing an interrogation technique based on a similar principle to the reflective-matched fiber Bragg grating sensing interrogation scheme, the interrogation error induced by the Gaussian assumption is quite small and can be neglected according to the analysis give by A. B. L. Ribeiro, L. A. Ferreira, J. L. Santos, and D. A. Jackson, "Analysis of the reflective-matched fiber Bragg grating sensing interrogation scheme," Appl. Opt., vol. 36, pp. 934-939, 1997

Table 1 shows the experimental results of using the first interrogator example illustrated in FIG. 3 to interrogate the distributed sensors (whose response spectra are shown in FIG. 5). The temperatures corresponding to the maximum output of the corresponding detectors of the interrogator are listed in Table 1. Using the equations shown in FIG. 4, we are able to calculate the wavelengths of the six FBG sensors being interrogated. The calculation results are listed in Table 1. For comparison reason, we also list the sensor wavelengths supplied by the manufacturer in this Table. As it shows, the measured results are in a very good agreement with the data supplied by the manufacturer. The small variation between the data measured and the manufacturer's numbers is believed to be due to the differences in measurement environments such as temperature and strain. It is well known that Bragg wavelength shifts with temperature at a rate of ~10 pm/° C. and strain at a rate of ~1 pm/µε around 1550 nm. Table 1 Comparison between the Bragg wavelengths of the FBG sensors measured by the proposed interrogator and the data supplied by the manufacturer (measured by an optical spectrum analyzer)

| Sensors | Peak Temperature (° C.) | Sensor Wavelength (nm) | Sensor Wavelength Supplied by The Manufacturer (nm) |
| --- | --- | --- | --- |
| 1 | 86.42 | 1542.661 | 1542.65 |
| 2 | 94.81 | 1543.534 | 1543.52 |
| 3 | 93.79 | 1544.315 | 1544.30 |
| 4 | 92.94 | 1545.096 | 1545.06 |

-continued

| Sensors | Peak Temperature (° C.) | Sensor Wavelength (nm) | Sensor Wavelength Supplied by The Manufacturer (nm) |
| --- | --- | --- | --- |
| 5 | 96.49 | 1545.913 | 1545.90 |
| 6 | 93.18 | 1546.659 | 1546.66 |

In the above table we show the interrogation results of six distributed fiber Bragg grating sensors, the number of the wavelength-modulated sensors can be monitored by a single AWG demultiplexer depends on the channel numbers and the channel spacing of the AWG device. For example, for a 40 channel, 100 GHz (0.8 nm) spacing AWG based demultiplexer, if the wavelength drifting range of the sensors is less than 0.8 nm, then 40 sensors can be interrogated at the same time. But if the wavelength drifting range is between 0.8 nm and 1.6 nm, then only 20 sensors can be interrogated simultaneously. In addition, the interrogator shown in FIG. 3 can be also used for the monitoring of other wavelength-modulated fiber optical sensors, such as Fabry-Perot type sensors, Long Period Grating fiber optical sensors and etc.

Figure 6:
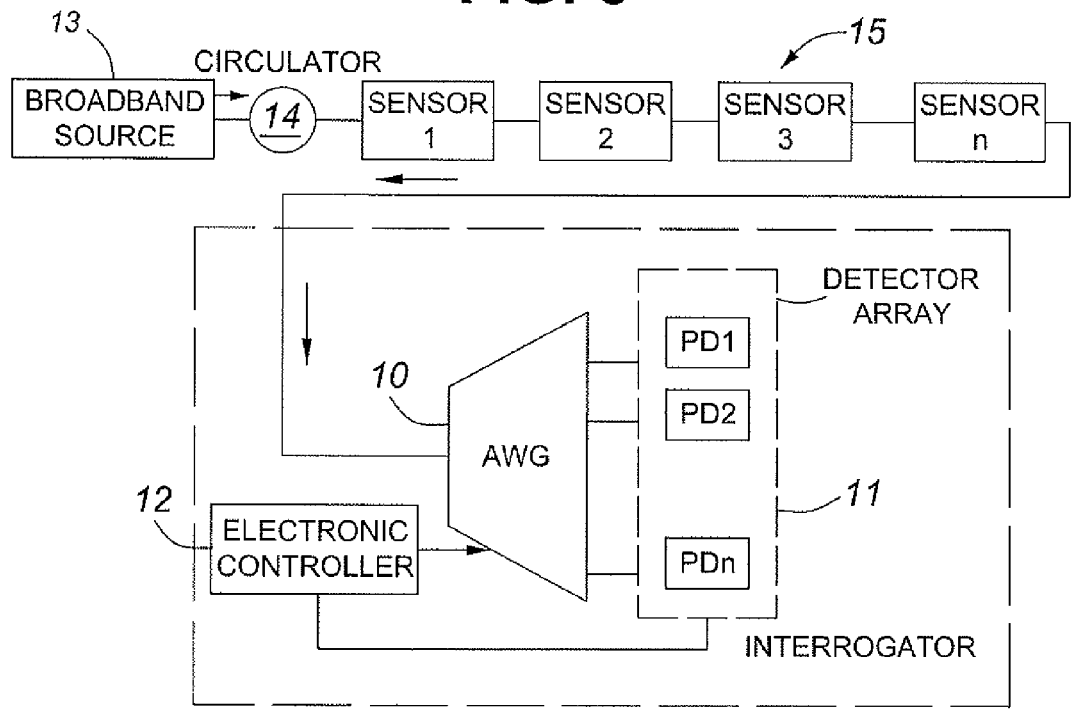
FIG. 6 is an illustration of the application variation of the interrogator system shown in FIG. 3.

In FIG. 3, the reflection signals are monitored. If we want to monitor the transmission signals of the sensors, we then do not need the circulator. We only need to attach the interrogator directly to the end of the sensors, as illustrated in FIG. 6.

A variation of the interrogator system shown in FIG. 3 is to integrate the broad-band source and the circulator with the interrogator. While a similar variation of the interrogator system shown in FIG. 6 is to integrate the broad-band source with the interrogator. The broad-band source is preferably a semiconductor chip based, but other type of broad-band sources will also serve the purpose. The circulator can also be a waveguide based or any other types.

Figure 7:
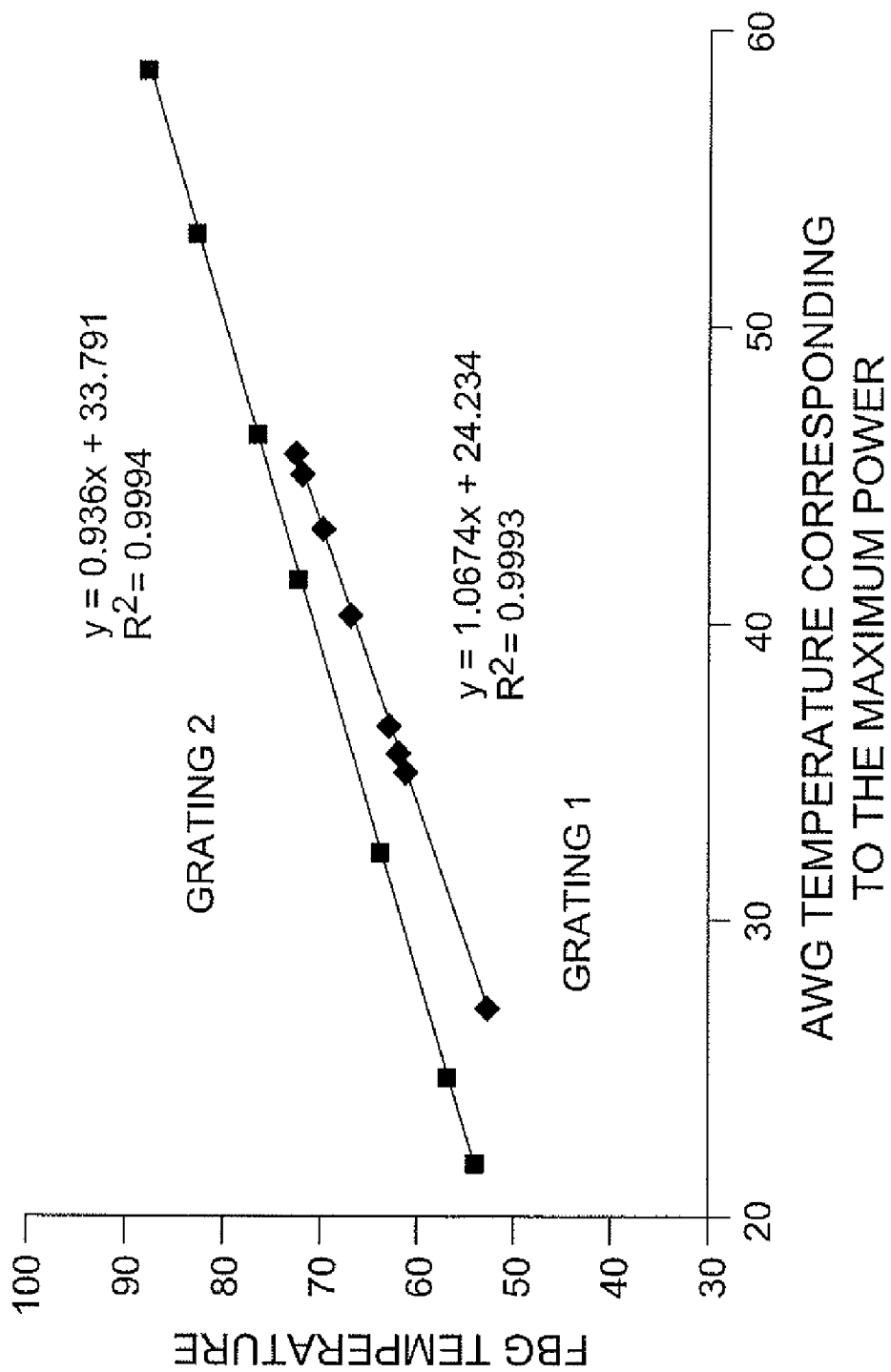
FIG. 7 is an illustration of the simultaneous interrogation results of two FBG based temperature sensors by using the interrogator example shown in FIG. 3.

FIG. 7 shows the results of using the first example illustrated in FIG. 3 for the simultaneously monitoring of two fiber Bragg grating based temperature sensors. As it shows, by monitoring the temperature of the arrayed waveguides corresponding to the maximum output of the AWG based demultiplexer, the temperature sensors can be precisely interrogated.

Though not described, one skilled in the art will realize that the proposed interrogator described in this invention can be used as part of a spectrometer for applications in chemical and physical analyses. In addition, one skilled in the art will also realize that the proposed interrogator described in this invention can be used as an optical performance monitor for applications in optical networks for the monitoring of optical signal wavelength, signal power and signal noise ratio.

What is claimed is:

1. A compact interrogator for the simultaneous interrogation of multi wavelength-modulated fiber optical sensors, comprising:

a planar waveguide based demultiplexer receiving optical signals from the sensors;

an array of detectors coupled to output waveguides of the demultiplexer corresponding to different nominal transmission wavelengths; and a tuning element for modifying the transmission wavelengths of the output waveguides by applying an external influence having a measurable value; and an electronic controller which scans said external influence to match the transmission wavelengths of the output waveguides to the optical signals from the respective sensors by finding the value corresponding to maximum output of said detectors and thereby permit the actual wavelengths of the optical signals to be determined from said value based on the relationship between said value and said transmission wavelengths.

2. The compact interrogator of claim 1, wherein the array of detectors is coupled to the output waveguides of the demultiplexer.

3. The compact interrogator of claim 1, wherein said external influence is an applied current or voltage, the demultiplexer is made of electro-optical materials, and the interrogator further comprises a device for recording the applied current or voltage.

4. The compact interrogator of claim 1, wherein the demultiplexer is an array waveguide grating based demultiplexer.

5. The compact interrogator of claim 1, wherein the demultiplexer is an echelle grating based demultiplexer.

6. The compact interrogator of claim 1, wherein the array of detectors is bonded to the output waveguides of the demultiplexer.

7. The compact interrogator of claim 1, wherein said external influence is heat or cold, and said measured value is temperature, said tuning element comprises a heater or cooler, and a temperature sensor is provided to measure said temperature.

8. The compact interrogator of claim 7, wherein the tuning element includes a film heater bonded to the back of a chip providing the demultiplexer.

9. The compact interrogator of claim 7, wherein the demultiplexer is an arrayed waveguide demultiplexer, and the tuning element includes a film heater deposited on the arrayed waveguides.

10. The compact interrogator of claim 7, wherein the tuning element includes a thermo electric cooler bonded to the back of a chip providing the demultiplexer.

11. The compact interrogator of claim 7, where the temperature sensor is selected from the group consisting of a thermistor and a resistive temperature detector.

12. The compact interrogator of claim 1, further comprising a broad band light source and an optical circulator.

13. The compact interrogator of claim 1 used as a spectrometer, or an optical performance monitor for optical signal wavelength, optical signal power and optical signal noise ratio measurement.

14. A compact interrogator for the simultaneous interrogation of multi wavelength-modulated fiber optical sensors, comprising:
    a planar waveguide based demultiplexer receiving optical signals from the sensors;
    an array of detectors coupled to output waveguides of the demultiplexer corresponding to different nominal transmission wavelengths; and
    a tuning element modifying the transmission wavelengths of the output waveguides by applying an external influence having a measurable value, said tuning element being selected from the group consisting of a heater, a cooler, and an electrode; and
    an electronic controller which scans said external influence to match the transmission wavelengths of the output waveguides to the optical signals from the respective sensors by finding the value corresponding to maximum output of said detectors and thereby permit the actual wavelengths of the optical signals to be determined from said value based on the relationship between said value and said transmission wavelengths.

15. The compact interrogator of claim 14, wherein said demultiplexer is selected from the group consisting of an arrayed waveguide (AWG) and an echelle grating.

16. A method of simultaneously interrogating a plurality of multi wavelength-modulated fiber optical sensors, comprising:
    receiving optical signals from said sensors in a planar waveguide based demultiplexer;
    detecting the demultiplexed signals at output waveguides of the demultiplexer corresponding to different nominal transmission wavelengths;
    applying an external influence with a measurable value to the demultiplexer to modify the transmission wavelengths of the output waveguides to match the wavelengths of optical signals from the respective sensors by finding the value corresponding to the detected maximum output of said waveguides; and
    determining the wavelengths of said optical signals from the value of said external influence at which a match occurs based on the relationship between said value and said transmission wavelengths.

17. The method of claim 16, wherein light from a broadband light source is applied to said sensors through a circulator, and light reflected from said sensors is input to said demultiplexer through said circulator.

18. The method of claim 16, which is used to provide a spectrometer, or an optical performance monitor for optical signal wavelength, optical signal power and optical signal noise ratio measurement.

19. The method of claim 16, wherein the transmission wavelengths of the output waveguides are modified by heating or cooling the demultiplexer.

20. The method of claim 16, wherein demultiplexer is made of electro-optical materials, and the transmission wavelengths of the output waveguides are modified by applying a voltage or current.

* * * * *